United States Patent
Rathbun et al.

(10) Patent No.: US 7,540,374 B2
(45) Date of Patent: Jun. 2, 2009

(54) CHAIN WEAR MONITORING DEVICE

(75) Inventors: Jonathan M. Rathbun, Belmont, MI (US); Joseph S. Melton, Jr., Grand Rapids, MI (US)

(73) Assignee: Frost Links, Inc., Grand Rapids, MI (US)

( * ) Notice: Subject to any disclaimer, the term of this patent is extended or adjusted under 35 U.S.C. 154(b) by 0 days.

(21) Appl. No.: 11/840,818

(22) Filed: Aug. 17, 2007

(65) Prior Publication Data

US 2008/0047804 A1 Feb. 28, 2008

Related U.S. Application Data

(60) Provisional application No. 60/839,980, filed on Aug. 24, 2006.

(51) Int. Cl.
*B65G 43/00* (2006.01)

(52) U.S. Cl. .............. 198/810.04; 198/810.02; 198/502.1

(58) Field of Classification Search .......... 198/502.1, 198/502.4, 810.04, 810.01, 810.02; 73/828, 73/862.391, 862.392
See application file for complete search history.

(56) References Cited

U.S. PATENT DOCUMENTS

| | | | |
|---|---|---|---|
| 3,963,115 A | 6/1976 | Teske et al. | |
| 3,998,317 A | 12/1976 | Stinnett | |
| 4,151,652 A | 5/1979 | Palma | 33/679.1 |
| 4,372,172 A * | 2/1983 | Gombocz et al. | 73/862.392 |
| 4,413,513 A | 11/1983 | Ross et al. | 73/162 |
| 4,566,339 A | 1/1986 | Davidson et al. | |
| 4,871,344 A | 10/1989 | Morisawa | |
| 5,186,280 A | 2/1993 | Mattcheck | 184/15.3 |
| 5,287,756 A | 2/1994 | Tassic | |
| 5,291,131 A * | 3/1994 | Suzuki et al. | 324/206 |
| 5,482,154 A | 1/1996 | Affeldt et al. | 198/370.04 |
| 5,490,590 A | 2/1996 | Courtney | 198/502.4 |
| 5,492,215 A | 2/1996 | Affeldt et al. | 198/464.4 |
| 5,563,392 A | 10/1996 | Brown et al. | |
| 5,884,747 A | 3/1999 | Sandstedt et al. | |
| 6,419,078 B1 | 7/2002 | Leathers | |
| 6,851,546 B2 * | 2/2005 | Lodge | 198/502.1 |
| 6,862,939 B2 | 3/2005 | Frost | |

(Continued)

OTHER PUBLICATIONS

International Search Report and Written Opinion for corresponding PCT Application No. PCT/US2007/076227, filed on Aug. 17, 2007.

*Primary Examiner*—James R Bidwell
(74) *Attorney, Agent, or Firm*—Van Dyke, Gardner, Linn & Burkhart LLP

(57) ABSTRACT

A conveyor system and method of measuring chain wear includes first and second sensing devices positioned at a conveyor line or path and directed toward a conveyor chain that is movable along the conveyor path. The first sensing device senses the presence of a first chain portion of the conveyor chain at a predetermined location as the conveyor chain moves along the conveyor line. The second sensing device senses a second chain portion of the conveyor chain as the conveyor chain moves along the conveyor line. The second sensing device is operable to sense a location of or distance to the second chain portion or may capture an image of the second portion. A controller is operable to determine a degree of wear of a section of chain extending between the first and second chain portions in response to the second sensing device.

31 Claims, 6 Drawing Sheets

U.S. PATENT DOCUMENTS

| | | |
|---|---|---|
| 6,865,955 B2 | 3/2005 | Nassar et al. |
| 6,991,094 B2 | 1/2006 | Frost |
| 6,993,978 B2 | 2/2006 | Frost |
| 7,133,742 B2 | 11/2006 | Cruysen et al. |
| 7,246,699 B2 | 7/2007 | Frost et al. |
| 2004/0226805 A1 | 11/2004 | Lodge |
| 2007/0056379 A1 | 3/2007 | Nassar et al. |

* cited by examiner

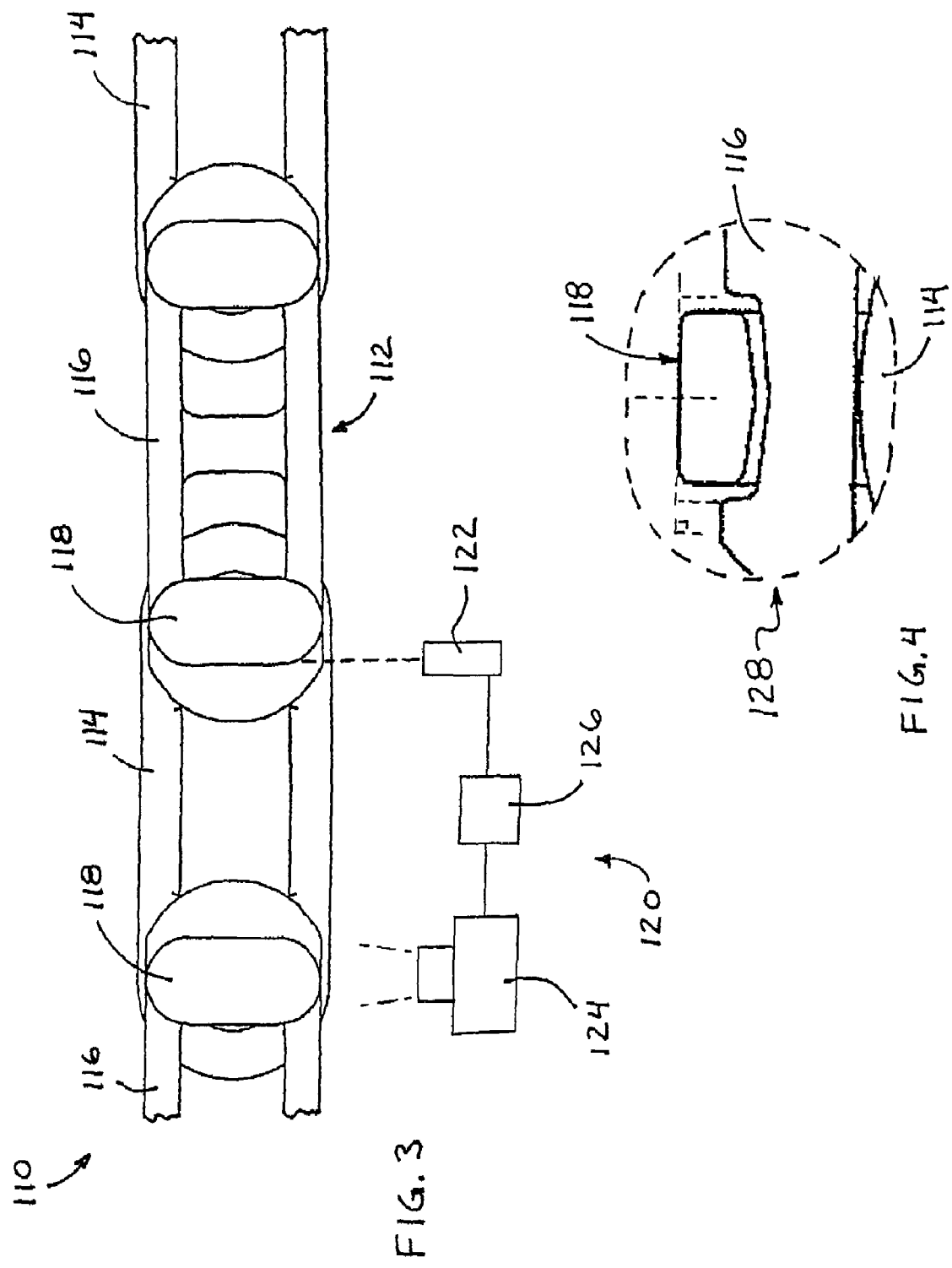

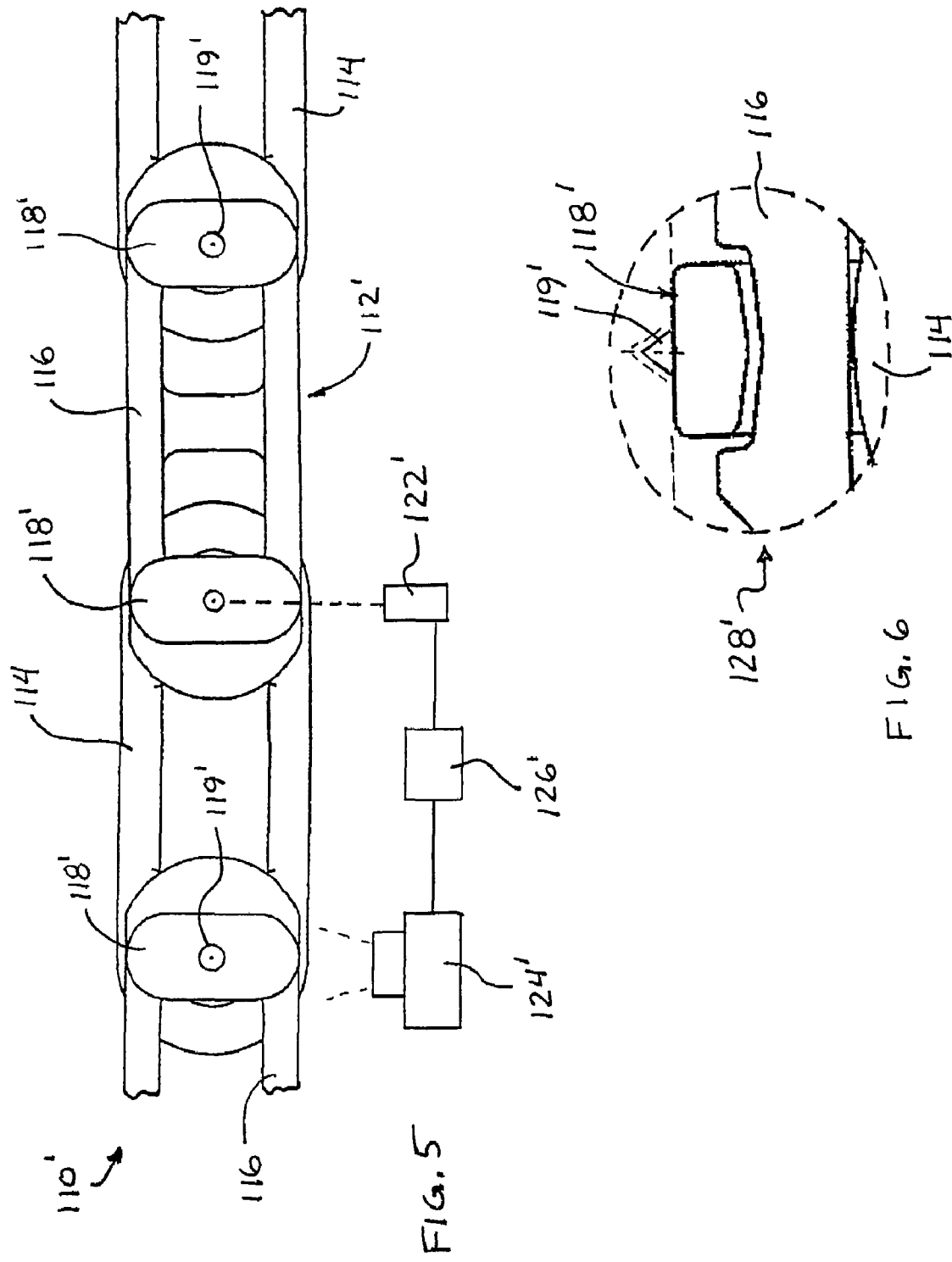

CHAIN WEAR MONITORING DEVICE

CROSS REFERENCE TO RELATED APPLICATION

The present application claims the benefit of U.S. provisional application, Ser. No. 60/839,980, filed Aug. 24, 2006, which is hereby incorporated herein by reference in its entirety.

FIELD OF THE INVENTION

The present invention relates generally to conveying systems and, more particularly, to conveying systems and chains for conveying materials around a conveying path or track of a facility, such as a warehouse or an assembly plant or processing plant or the like.

BACKGROUND OF THE INVENTION

Chains for power transmission or for material handling and processing systems, such as, for example, chains which function to move a plurality of trolleys or the like along a path or conveyor line in a processing plant, warehouse or the like, typically include multiple sections or links joined together by pins or bolts, such as I-pins or other connecting elements. As the chain is moved along the conveying path, the links and sections of the chain undergo bends and turns along a continuous conveying path or chain loop. As a section of chain bends, the pins may rotate within the openings in the center links and/or side links, which results in wear on both the pins and the center links and/or side links. The wear leads to an increase in the effective length of the chain or section of chain as well as a change in the pitch of the chain as gaps then may occur between the pins and links. It is generally undesirable to allow excessive wear in the chain, since this results in slack in the chain and/or a change in chain pitch and/or a change in the distance between products being processed, or may further result in noise and further wear or weakening of the chain. Typically, when the chain wear results in an increase in length of approximately 4-6 inches in a length of a section of chain that is initially a 10-foot section of chain, the chain must be replaced.

Typically, the length of a chain or section of chain is measured by detecting chain features, such as a forged pin or a forged chain link as the chain travels along the conveying path. Such known measurement devices may measure relative wear on a conveyor chain based on an initial base-line reading of the chain. Such known measurement devices thus provide a measurement of the degree of wear over a chain or multiple chain sections. The length of a section of chain may be determined by detecting the leading ends of selected center links and knowing the speed of the chain along the conveying path. The speed of the chain and the time between detections may then be used to calculate the distance or length of the section of chain. This length may be monitored to approximate the wear in the pins and/or links of the sections of chain. However, the center links are typically forged members and may have variable lengths due to the manufacturing tolerances of the center links and surface irregularities of the links. Further, the speed of the chain may vary from a nominal speed as the chain moves along the conveyor path. Such chain characteristics and speed variations may result in a high variability in the measured length of the chain links or sections of chain.

Therefore, there is a need in the art for a conveyor system that overcomes the short comings of the prior art.

SUMMARY OF THE INVENTION

The present invention provides a conveyor system that measures the pitch of a chain by directly measuring pin-to-pin distance of adjacent pins of the chain (such as pins at opposite ends of a common center link or a pair of side links). The measurement device utilizes two sensing devices, such as laser sensing devices or the like. One sensing device is operable to sense the presence of a chain portion, such as a pin or other portion of the chain, at a predetermined location and is operable to generate an output signal that triggers or actuates the other sensing device to cause the other sensing device to measure the distance to or to determine the location of the next or subsequent chain portion or pin or the like.

According to an aspect of the present invention, a conveyor system includes a conveyor line or path, such as an I-beam track for a trolley, a conveyor chain movable along the conveyor line, first and second sensing devices and a controller. The conveyor chain comprises a plurality of center links, a plurality of side links and a plurality of chain pins that connect respective side and center links together. The first sensing device is positioned at the conveyor line and directed toward the conveyor chain. The first sensing device senses the presence of a first chain portion of the conveyor chain at a particular location (such as at a predetermined location relative to the first sensing device) as the conveyor chain moves along the conveyor line. The second sensing device is positioned at the conveyor line and directed generally toward the conveyor chain. The second sensing device senses a second chain portion of the conveyor chain as the conveyor chain moves along the conveyor line. The controller is operable to determine a degree of wear of a section of chain extending between the first and second chain portions in response to an output of the second sensing device that is indicative of the second sensing device sensing the second chain portion of the chain.

The second sensing device may sense a location of or distance to the second chain portion in response to the first sensing device sensing the presence of the first chain portion. The first sensing device may comprise a proximity sensor that detects the presence of the first chain portion at a predetermined location along the conveyor line. The first sensing device generates an output signal when the first sensing device detects the presence of the first chain portion at the predetermined location, and the second sensing device senses the second chain portion in response to the output signal. The second sensing device may detect or sense or determine a distance from the second sensing device to the second portion in response to the output signal. The controller may determine a distance between the first and second chain portions in response to an output of the second sensing device that is indicative of the second sensing device sensing the second chain portion of the chain.

The first and second sensing devices are spaced a predetermined spacing distance apart. The controller may determine a distance between the first and second chain portions as a function of the predetermined spacing distance and the sensed distance from the second sensing device to the second chain portion.

Optionally, the second sensing device may comprise an imaging sensor that captures an image of the second chain portion in response to the first sensing device sensing the first chain portion. The controller may process captured image data to determine the degree of wear of the section of chain, such as by comparing a captured image of the second chain portion to a baseline image or parameter or characteristic.

Optionally, the conveyor system may include a third sensing device positioned at the conveyor line and directed generally toward the conveyor chain and sensing the second chain portion of the conveyor chain as the conveyor chain moves along the conveyor line. The controller may determine a speed of the conveyor chain in response to a separation distance of targeted areas of the second and third sensing devices and a time elapse between detection of the second chain portion by the second and third sensing devices. The controller may determine the degree of wear of the section of chain and/or the distance between the first and second chain portions in response to the determined speed of the conveyor chain and an output of the first sensing device indicative of the first sensing device sensing the first chain portion and an output of the second sensing device indicative of the second sensing device sensing the second chain portion.

According to another aspect of the present invention, a method of measuring chain wear in a section of conveyor chain traveling along a conveyor line includes providing first and second sensing devices and sensing a first chain portion of the conveyor chain with the first sensing device and generating an output signal when the first chain portion is sensed. The second sensing device senses a second chain portion of the conveyor chain, and may be actuated to sense the second chain portion in response to the output signal of the first sensing device. A degree of wear of a section of chain extending between the first and second chain portions of the conveyor chain is determined in response to an output of the first sensing device indicative of the first sensing device sensing the first chain portion and an output of the second sensing device indicative of the second sensing device sensing the second chain portion.

Therefore, the present invention provides a conveyor system and/or method that is operable to determine a degree of wear of a section of chain and/or a distance between portions of a chain or section of chain, such as between two adjacent or consecutive chain pins or the like. The first sensing device detects the presence of the first portion or pin and the output signal generated by the first sensing device triggers or causes the control to actuate the second sensing device to determine the location (such as via a distance determination from the second sensing device to the second portion) of the second chain portion or pin. The distance between the first and second chain portions may be determined as a function of the known separation distance of the sensing devices and the sensed distance between the second sensing device and the second chain portion at or substantially near the particular moment in time when the location of the first chain portion relative to the first sensing device is known. Optionally, the system may determine a speed of the chain and, based on the determined speed of the chain and a known separation distance between the sensing devices, determine the degree of wear of the section of chain and/or the distance between the sensed chain features. The measurement device or system or method of the present invention thus may provide a distance measurement between consecutive or adjacent chain pins or other chain portions or features to determine the pitch of the chain for at least some, and optionally all, of the sections or links of the chain.

These and other objects, advantages, purposes and features of the present invention will become apparent upon review of the following specification in conjunction with the drawings.

BRIEF DESCRIPTION OF THE DRAWINGS

FIG. 3 is a plan view of a section of chain and another chain wear measurement device in accordance with the present invention;

FIG. 4 is an image captured by the imaging sensor of the chain wear measurement device of FIG. 3;

FIG. 5 is a plan view of a section of chain and another chain wear measurement device in accordance with the present invention;

FIG. 6 is an image captured by the imaging of the chain wear measurement device of FIG. 5;

DESCRIPTION OF THE PREFERRED EMBODIMENTS

Figure 1:
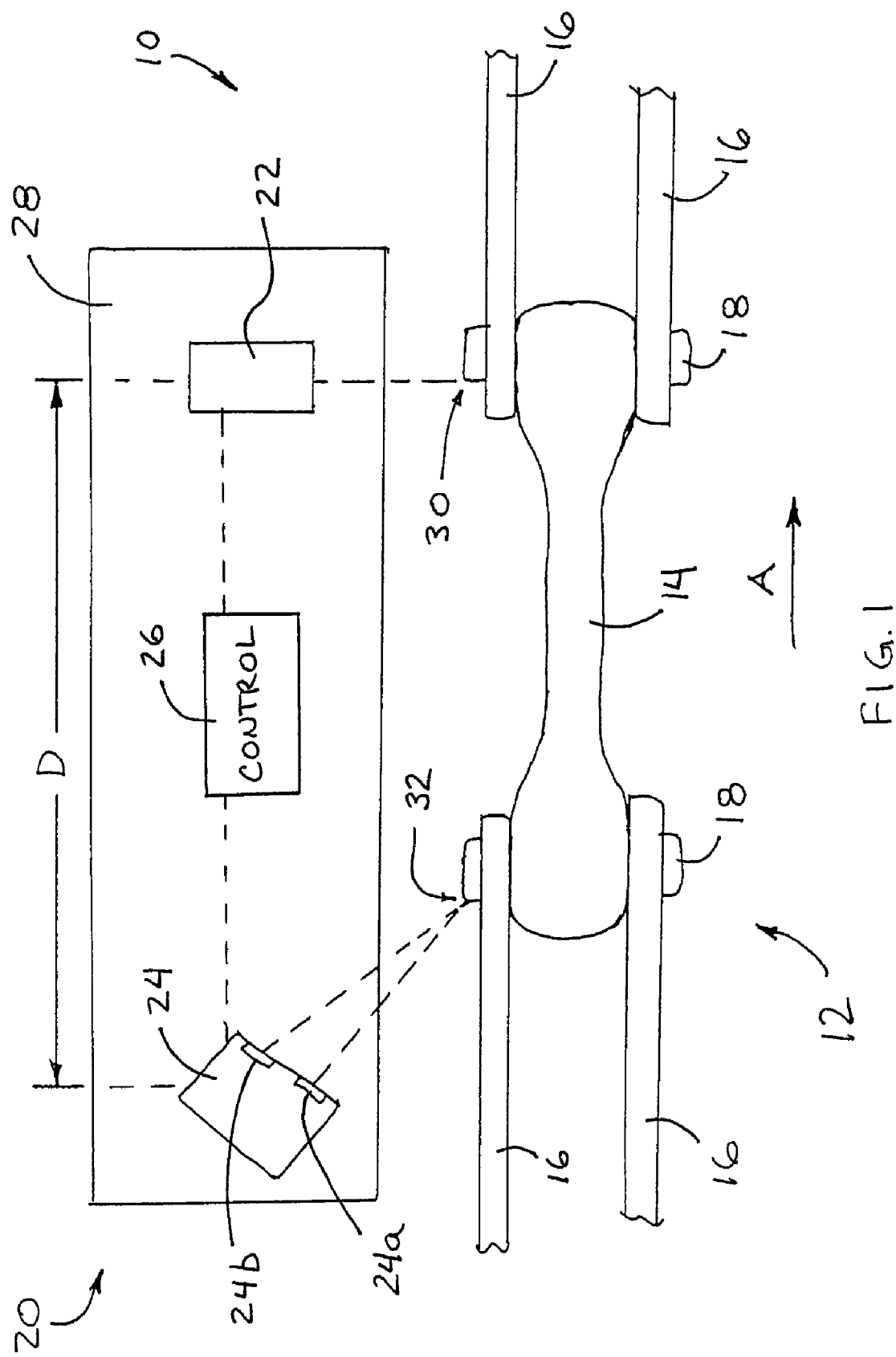
FIG. 1 is a side elevation of a section of chain and a chain wear measurement device in accordance with the present invention.

Referring now to the drawings and the illustrative embodiments depicted therein, a conveyor system 10 includes a conveyor chain 12 routed and driven along a conveying path at or in a facility, such as a warehouse, assembly plant and/or the like (FIG. 1). The conveyor line includes a continuous loop or path or track set up in a desired route or layout, and along which a plurality of trolleys or the like are conveyed. The trolleys are connected together via a continuous drive chain, such as a chain comprising a plurality of chain links (such as center links 14 and side links 16) connected together by a plurality of chain pins 18 (such as I-pins or bolted pins or the like). The conveyor system includes a wear measurement or pitch measurement device or system 20, which includes a first sensor or detecting or sensing device 22 and a second sensor or detecting or sensing device 24. The wear measurement device 20 is located along the conveyor path and with the sensing devices 22, 24 directed toward the chain as the chain moves along the conveyor path and past the wear measurement device. The wear measurement device 20 measures or determines or calculates or approximates the distance between successive or adjacent or spaced apart pins (or other elements or features) of the chain to determine the chain pitch and degree of wear in the chain or section of the chain, as discussed below. A controller or processor 26 of wear measurement device 20 may receive an output generated by the sensing devices 22, 24 and may control the sensing devices and determine the chain wear and/or chain pitch in response to the outputs of the sensing devices, as also discussed below.

The conveyor chain includes multiple links or linkages connected together in a continuous loop about a conveying system, such as is known in the art. The chain links and pins may comprise any type of chain links or pins, without affecting the scope of the present invention. For example, the chain links or pins may utilize aspects of chains such as the types commercially available in the Frost Smooth link and Frost Sani-link chains, manufactured and marketed by Frost Links, Inc. of Michigan, or may be formed utilizing the principles described in U.S. Pat. Nos. 6,991,094 and/or 7,246,699, which are hereby incorporated herein by reference in their entireties. The chain pins may include pin extensions at the head portion or portions of the pins, such as by utilizing aspects of the chain pin and wear measurement system described in U.S. Pat. Nos. 6,862,939 and 6,993,978, which are hereby incorporated herein by reference in their entireties.

The chain may be connected to trolleys or the like that are driven around the conveying track (such as an I-beam track or the like) via the chain and a driving device or motor or the like.

As shown in FIG. 1, the first and second sensing devices 22, 24 may be mounted to a mounting structure or plate 28, such that the sensing devices 22, 24 are spaced apart by a predetermined and known spacing distance D (such that the areas or points or locations along the chain that are targeted by the sensing devices are also spaced apart by a predetermined and known spacing distance). The mounting structure or plate 28 is mounted at or positioned along the conveyor line or path so that the first and second sensing devices 22, 24 are directed generally toward the conveyor chain as the chain travels along the conveyor path. Optionally, the sensing devices may be otherwise mounted or positioned at the conveying line, such as at separate mounting plates or brackets or elements, with the spacing distance between the mounted sensing devices being set or known, without affecting the scope of the present invention. The sensing devices may be mounted above the chain and directed downward toward an upper portion of the chain or they may be mounted below or to either side of the chain to detect the chain portions as the chain moves along the conveying line, without affecting the scope of the present invention.

In the illustrated embodiment, first sensing device 22 is a proximity sensor that functions to sense or detect the presence of a first chain portion 30, such as an edge of a head portion of a chain pin (as shown in FIG. 1), at a predetermined location as the chain travels along the conveyor path. Preferably, first sensing device 22 comprises a laser proximity sensing device that emits and receives a laser beam to detect the presence of the first chain portion at a predetermined location along the conveyor path (such as at a particular location relative to the first sensing device 22). The first sensing device 22 thus may be directed substantially directly toward the conveyor chain, such as from above the conveyor chain and toward an upper portion of the chain (as shown in FIG. 1). When the presence of the first chain portion (i.e., a leading or trailing edge of a head portion of a chain pin or the like) is sensed by first sensing device 22, first sensing device 22 generates an output signal indicative of the presence of the pin or first chain portion. The output signal may be received by the controller 28 or may be received by the second sensing device 24, whereby the second sensing device 24 is actuated or triggered to measure the distance from the second sensing device 24 to the second chain portion in response to the output signal of the first sensing device 22.

Second sensing device 24 preferably comprises a distance measuring device, such as a laser distance measuring device. In the illustrated embodiment, second sensing device 24 includes a transmitting element 24a, such as for emitting a laser beam in a predetermined direction, and a receiving element 24b, such as for receiving a reflected beam as the laser beam emitted by transmitting element 24a is reflected off of the chain as the chain travels along the conveyor path. The second sensing device 24 thus is actuated or triggered to measure or determine the distance between the second sensing device 24 and a second portion 32 of the chain at or substantially near the particular moment in time that the first sensing device senses the presence of the first chain portion 30 at the particular or predetermined location. Second sensing device 24 may generate an output signal indicative of the detected or measured distance between the second sensing device 24 and the second portion 32 of the chain.

Controller 26 may also be mounted to the mounting structure 28 (or may be located remote from the sensing devices) and receives the output signal from second sensing device 24. Optionally, controller 26 may also receive the output signal from first sensing device 22 and may function to control or actuate or trigger second sensing device 24 in response to the output signal from the first sensing device. Controller 26 determines the distance between the first and second chain portions in response to the output signal from second sensing device 24. Because the spacing distance D between the first and second sensing devices is a known value, and because the distance from the second sensing device 24 to the second chain portion is determined at or substantially at the time when the location of the first chain portion relative to the first sensing device 22 is known, the controller may determine or calculate or approximate or estimate the distance between the first and second chain portions as a function of the known spacing distance and the measured distance between the second sensing device and the second chain portion. Optionally, the controller may compare the determined distance between the second sensing device and the second chain portion to a baseline or expected distance or length (which would be expected for an unworn or new section of chain at the time in which a first chain portion of an unworn or new section of chain is detected by the first sensing device).

Figure 2:
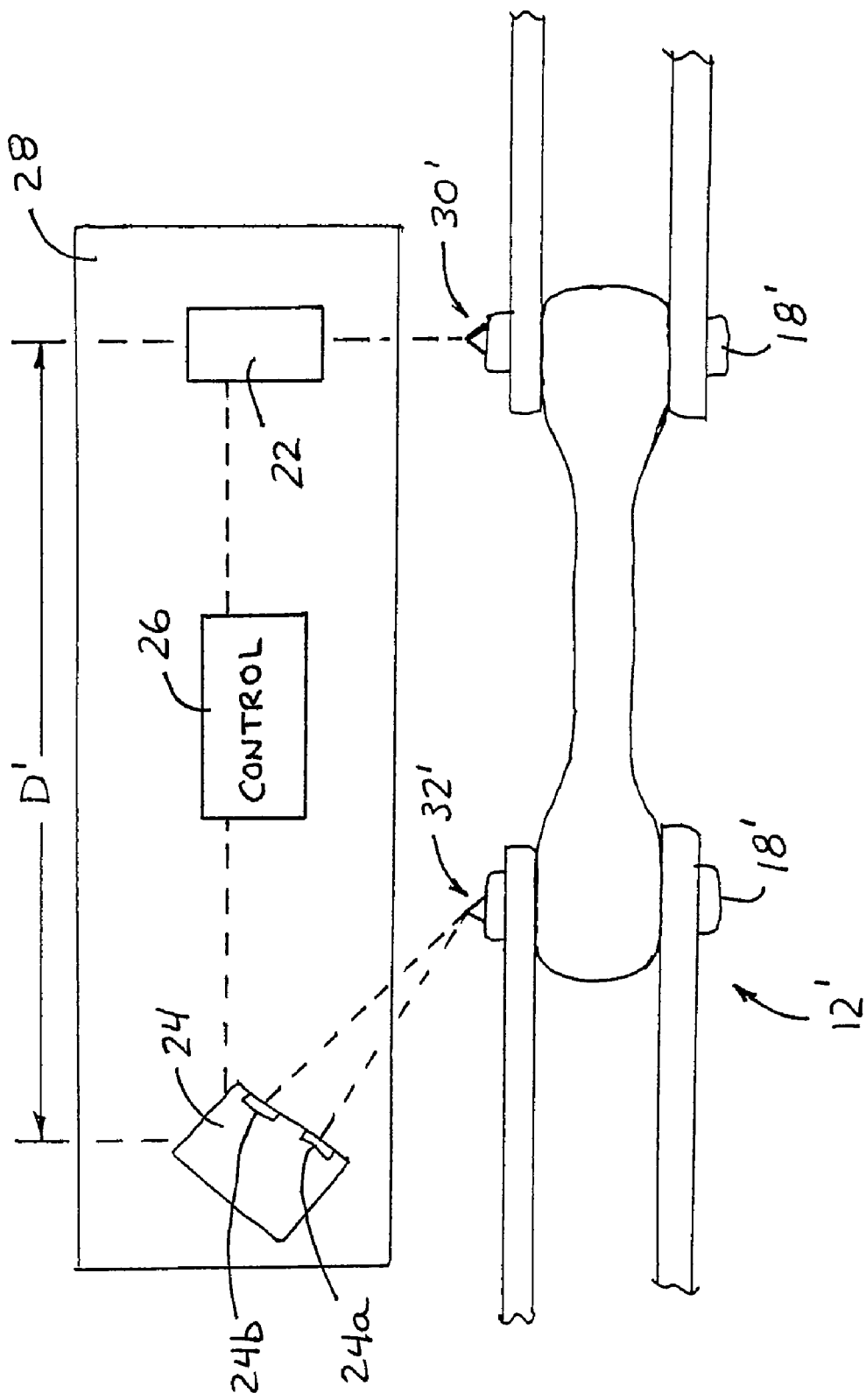
FIG. 2 is a side elevation of a section of chain and another chain wear measurement device in accordance with the present invention.

Desirably, the sensing devices 22, 24 function to detect a leading or trailing edge of a head portion of a respective chain pin (such as adjacent or consecutive chain pins or chain pins spaced a predetermined number of links apart or the like). As shown in FIG. 1, the sensing devices 22, 24 may detect the trailing edges of head portions of adjacent pins 18 of the conveyor chain 12 as the chain travels in the direction of arrow A. Optionally, and as shown in FIG. 2, the sensing devices 22, 24 may detect projections or points 30', 32' of adjacent pins 18' of a conveyor chain 12' (such as projections similar to those described in U.S. Pat. Nos. 6,862,939 and 6,993,978, which are hereby incorporated herein by reference in their entireties). Although shown and described as the first or proximity sensing device sensing the lead chain portion and the second or distance sensing device sensing the trailing chain portion (that follows the lead chain portion as the chain travels along the conveyor path), the first or proximity sensing device may sense the presence of a trailing chain portion (such as, for example, if the chain were traveling in the opposite direction in FIG. 1), whereby the second or distance sensing device may be triggered to sense a leading chain portion (that is traveling ahead of the trailing chain portion as the chain travels along the conveyor path in the direction of travel) in response to the detection of the presence of the trailing chain portion by the first or proximity sensing device, without affecting the scope of the present invention.

Referring now to FIGS. 3 and 4, a conveyor system 110 includes a drive chain 112 and a wear measurement or pitch measurement device or system 120, which includes a proximity sensor or detecting or sensing device 122 and an imaging sensor or camera 124. The wear measurement device 120 is located along the conveyor path and with the sensors 122, 124 directed toward the chain as the chain moves along the conveyor path and past the wear measurement device. The wear measurement device 120 measures or determines or calculates or approximates the distance between successive or adjacent or spaced apart pins of the chain to determine the chain pitch and wear in the chain sections of the chain. A controller or processor 126 of wear measurement device 120 may receive an output generated by imaging sensor 124 and may process the images captured by imaging sensor 124 to determine the chain wear and/or chain pitch, as discussed below.

As described above, conveyor chain 112 travels along a continuous loop or path or track set up in a desired route or layout, and is connected to a plurality of trolleys or the like. The chain 112 comprises a plurality of chain links (such as center links 114 and side links 116) connected together by a plurality of chain pins 118 (such as I-pins or bolted pins or the like).

Proximity sensor 122 is positioned along the conveying path to detect a particular or targeted characteristic of the chain 112, such as the head portion of a pin 118, such as a leading edge or trailing edge of the head portion of the pin as shown in FIG. 3. The imaging sensor 124 is spaced a predetermined distance from proximity sensor 122 (or the imaging sensor 124 is arranged so as to target a location or area that is a predetermined distance from the location or area targeted by proximity sensor 122) so that when proximity sensor 122 senses the targeted portion of the chain 112 (such as a leading edge or trailing edge of the head portion of the pin or such as any other determinable feature of the pin or chain links), the head portion of another pin is positioned at and within the field of view of the imaging sensor 124. The targeted characteristic of the chain for sensing by the proximity sensor may be any suitable characteristic or feature of the chain or chain links or pins, and may be sensed at or near the imaging sensor (such as the head portion of an adjacent pin as shown in FIG. 3, or such as a head portion of another pin of the chain or any other feature or characteristic along the chain). Imaging sensor 124 may comprise any suitable sensor or image capturing device or camera, such as a pixelated imaging array sensor, such as a charge-coupled device (CCD) sensor or a complementary-metal-oxide-semiconductor (CMOS) sensor or the like, without affecting the scope of the present invention.

Wear measurement device or system 120 includes a controller or processor 126 that receives an output signal from proximity sensor 122 and controls or actuates imaging sensor 124 to capture an image when the output from proximity sensor 122 is indicative of a detection of the targeted characteristic of chain 112. Imaging sensor 124 thus captures an image of the head portion of a pin in response to controller 126. The image is thus captured at the appropriate moment in time when the head portion of the pin is within the field of view of the imaging sensor 124, as shown in FIG. 4.

Controller 126 is operable to process the captured image data to determine the location of the head portion of the pin and to compare the location to that of a baseline or initial or unworn pin and chain. The controller thus may determine a degree of wear of the chain and pin based on the current location of the pin (as captured by the imaging sensor and compared to a baseline or known or predicted location of a pin of an unworn chain) relative to another pin or other characteristic of the chain (as sensed by the proximity sensor). For example, the controller may process the captured images 128 (FIG. 4) to determine the center of the pin and angle of the pin (such as by detecting the sides of the head portion and calculating the center and such as by determining the angle of the upper surface of the head portion of the pin), and may compare these features to the baseline center of the pin (where the center of the pin would be for a new or unworn chain) and the baseline angle of the upper surface of the head portion. The controller may determine or calculate a distance between an edge of the head portion and the known or expected location of the edge of an unworn chain. Any change or difference between the captured image and a baseline parameter or an expected location of a second chain portion for an unworn section of chain may be calculated or determined to arrive at a degree of wear in that section of chain (the section between the proximity sensor and the imaging sensor). The detected edge or feature of the pin or chain may be detected by the imaging sensor and controller using known image processing techniques, such as edge detection algorithms or the like. The proximity sensor and imaging sensor may be positioned to sense or image adjacent or consecutive pins (such as pins at opposite ends of a center link as shown in FIG. 3) or spaced apart or remote pins (such as pins at different sections or portions of the drive chain), or other spaced apart characteristics or features of the chain (such as characteristics of consecutive or spaced apart or remote chain links or the like), depending on the particular application of the wear detection system.

Optionally, and as shown in FIGS. 5 and 6, the chain 112' of a conveyor system 110' may include pins 118' with a protrusion or extension 119' at the head portion of the pins. The wear detection system 120' then may determine the wear in the section of chain with the sensed feature or characteristic (as sensed by the proximity sensor 122') and/or the imaged feature or characteristic (as imaged by the imaging sensor 124') may comprise the protrusion or extension 119' at the head portion of the pin 118'. In such an embodiment, the processor 126' may process the captured image 128' to determine the location of the protrusion 119' and to compare the location to a baseline location (a location where the protrusion would be expected to be if the chain or section of chain were new or not worn). The controller 126' then may determine the degree of wear in the chain or section of chain or chain pitch of the conveyor system. The proximity sensor and imaging sensor may be positioned to sense or image adjacent or consecutive pins (such as pins at opposite ends of a center link as shown in FIG. 5) or spaced apart or remote pins (such as pins at different sections or portion of the drive chain), or other spaced apart characteristics or features of the chain (such as characteristics of consecutive or spaced apart or remote chain links or the like), depending on the particular application of the wear detection system, whereby the controller determines the degree of wear of the section of chain that extends between the detected or sensed or imaged chain portions.

The controller 126, 126' and chain wear detection system 110, 110' thus may determine a degree of wear or chain pitch in the chain between the sensed chain characteristic and the imaged pin. The captured image data is processed to determine an offset or variation of the captured image relative to the expected or predetermined or known location of the similar characteristic of an unworn or new chain or section of chain. The degree of wear in the section of chain thus may be readily determined. Also, the distance between the imaged pin and the sensed pin (or other chain characteristic or feature) or the pitch of the section of chain may be determined based on the detected offset and/or the known separation distance between the proximity sensor and the imaging sensor and/or the known separation distance between the areas or regions targeted by the proximity sensor and imaging sensor. The wear detection system may capture multiple images of various portions or sections of the chain to determine or monitor the degree of wear or chain pitch in the different or various sections of the chain of the conveyor system.

Figure 7:
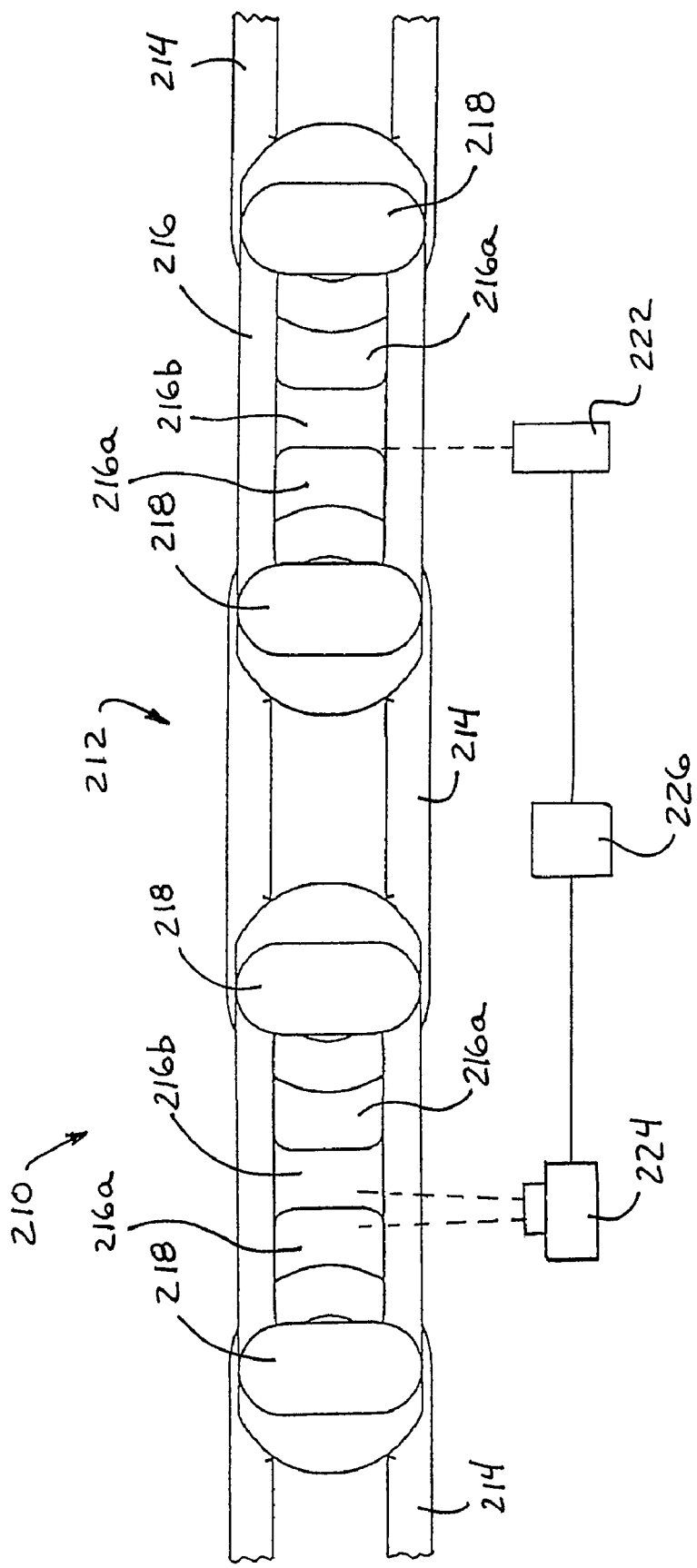
FIG. 7 is a plan view of a section of chain and another chain wear measurement device in accordance with the present invention.

Referring now to FIG. 7, a conveyor system 210 includes a drive chain 212 and a wear measurement or pitch measurement device or system 220, which includes a proximity sensor or detecting or sensing device 222 and an imaging sensor or camera 224. Similar to the wear measurement devices or systems described above, wear measurement device 220 is located along the conveyor path and with the sensors 222, 224 directed toward the chain as the chain moves along the conveyor path and past the wear measurement device. Wear measurement device 220 measures or determines or calculates or approximates the distance between successive or adjacent or spaced apart pins of the chain to determine the chain pitch and wear in the chain sections of the chain. A controller or processor 226 of wear measurement device 220 may receive an output generated by imaging sensor 224 and may process the images captured by imaging sensor 224 to determine the chain wear and/or chain pitch.

As described above, conveyor chain 212 travels along a continuous loop or path or track set up in a desired route or layout, and is connected to a plurality of trolleys or the like. The chain 212 comprises a plurality of chain links (such as center links 214 and side links 216) connected together by a plurality of chain pins 218 (such as I-pins or bolted pins or the like). As can be seen in FIG. 7, side links 216 have openings or aperture 216*a* formed therethrough (such as two openings or apertures formed therethrough and separated by a center connecting portion 216*b* of side link 216) for receiving pins 218 through the side links. Optionally, and preferably, the openings 216*a* are punched through side links 216*a*, whereby the punching process provides a substantially controlled and repeatable process that substantially consistently forms the openings or apertures 216*a* through the side links 216.

Proximity sensor 222 is positioned along the conveying path to detect a particular or targeted characteristic of the chain 212, such as a leading or trailing edge of the connecting portions 216*b* of the side links 216 as shown in FIG. 7. The imaging sensor 224 is spaced a predetermined distance from proximity sensor 222 so that when proximity sensor 222 senses the leading edge or trailing edge of the connecting portion 216*b*, the connecting portion of another side link is positioned at and within the field of view of the imaging sensor 224. The edges of the punched aperture, such as the edge along the connecting portions 216*b* of the side link, are squared off edges that provide a highly repeatable and squared edge for the imaging sensor to image to enhance the edge detection and processing capabilities of the system.

Wear measurement device or system 220 includes a controller or processor 226 that receives an output signal from proximity sensor 222 and controls or actuates imaging sensor 224 to capture an image when the output from proximity sensor 222 is indicative of a detection of the targeted characteristic of chain 212. Imaging sensor 224 thus captures an image of the generally squared-off, leading edge of the connecting portion 216*b* of side link 216 in response to controller 226. The image is thus captured at the appropriate moment in time when the connecting portion 216*b* of the side link is within the field of view of the imaging sensor 224. Although shown in FIG. 7 with the proximity sensor 222 and imaging sensor 224 directed toward the section of chain from the side of the section of chain (so as to be directed toward the side of the pins), this is done for purposes of clearly showing the sensors and the apertures and connecting portions of the side links. Clearly, the sensors may be directed toward the section of chain at other angles, and preferably downward onto the side links, so as to substantially image the cut edge of the punched aperture of the side link as the chain travels along the conveying path, while remaining within the spirit and scope of the present invention.

Controller 226 is operable to process the captured image data to determine the location of the leading or trailing edge of the connecting portion of the side link and to compare the location to that of a baseline or initial or unworn side link and chain or section of chain. The controller thus may determine a degree of wear of the chain (such as of the pins and/or side links and/or center links of the chain) based on the current location of the connecting portion of the side link (as captured by the imaging sensor and compared to a baseline or known location of an unworn chain) relative to the connecting portion of another side link of the chain (as sensed by the proximity sensor). The detected edge or feature of the side link may be detected by the imaging sensor and controller using known image processing techniques, such as edge detection algorithms or the like. The proximity sensor and imaging sensor may be positioned to sense or image adjacent or consecutive side links (such as side links connected to opposite ends of a center link as shown in FIG. 7) or spaced apart or remote side links (such as side links at different sections or portion of the drive chain), or other spaced apart characteristics or features of the chain (such as other characteristics or features of consecutive or spaced apart or remote chain links or the like), depending on the particular application of the wear detection system.

The controller 226 and chain wear detection system 210 thus may determine a degree of wear or chain pitch in the chain between the sensed chain characteristic and the imaged side link. The captured image data is processed to determine an offset or variation of the captured image relative to the expected or predetermined or known or baseline location of the similar characteristic of an unworn or new chain or section of chain. The degree of wear in the section of chain thus may be readily determined. Also, the distance between the imaged side link and the sensed side link or the pitch of the section of chain may be determined based on the detected offset and the known separation distance between the proximity sensor and the imaging sensor. The wear detection system may capture multiple images of various portions or sections of the chain to determine the wear or chain pitch in the different or various sections of the chain of the conveyor system.

Figure 8:
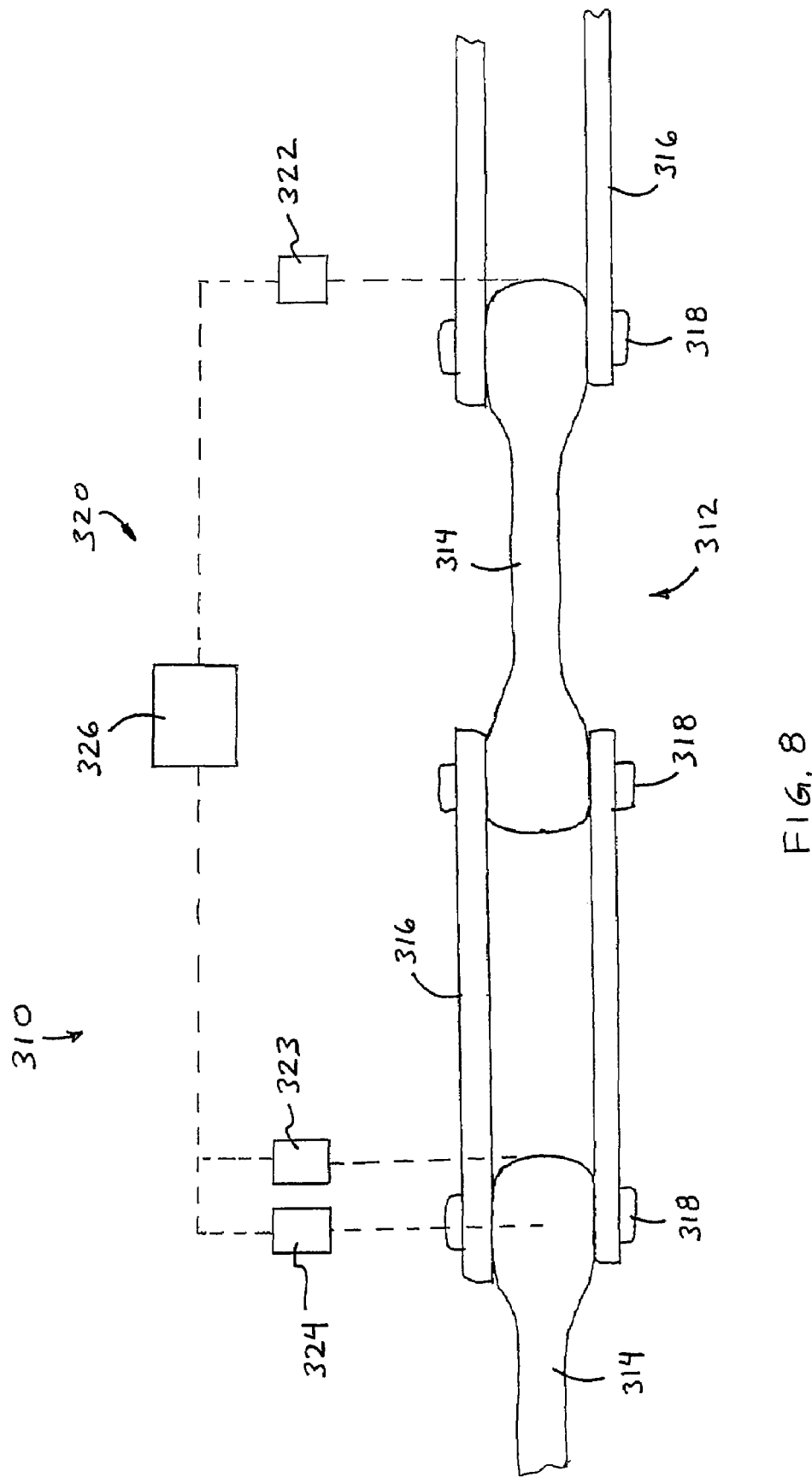
FIG. 8 is a plan view of a section of chain and another chain wear measurement device in accordance with the present invention.

Optionally, and with reference to FIG. 8, a conveyor system 310 includes a conveyor chain 312 comprising a plurality of chain links (such as center links 314 and side links 316) connected together by a plurality of chain pins 318 (such as I-pins or bolted pins or the like). The conveyor system includes a wear measurement or pitch measurement device or system 320, which includes a first sensor or detecting or sensing device 322, a second sensor or detecting or sensing device 323, and a third sensor or detecting or sensing device 324. The wear measurement device 320 is located along the conveyor path and with the sensing devices 322, 323, 324 directed toward the chain as the chain moves along the conveyor path and past the wear measurement device. The wear measurement device 320 measures or determines or calculates or approximates the speed of the chain in response to output signals generated by sensing devices 323, 324, and measures or determines or calculates or approximates the distance between successive or adjacent or spaced apart chain elements (such as the ends of the center links or side links or such as pins) of the chain to determine the chain pitch and degree of wear in the chain sections of the chain. A controller or processor 326 of wear measurement device 320 may receive an output generated by the sensing devices 322, 323, 324 and may control the sensing devices and determine the chain wear and/or chain pitch in response to the outputs of the sensing devices, such as in a similar manner as discussed above.

In the illustrated embodiment, sensing devices 322, 323, 324 comprise laser sensors (however, other sensing means may be utilized) directed toward respective areas that encompass the ends or edges of the center links as the center links and chain move along the conveying path. The sensing devices 323 and 324 are spaced apart a known distance (and/or are arranged to target particular areas or regions or locations that are spaced apart a known distance) and function to detect a chain portion or element or characteristic, such as, for example, a leading end or edge 314*a* of a center link 314 (or other chain element or component). The other sensing device 322 is spaced further from the sensing devices 323, 324 and functions to detect a chain element, such as, for example, a leading end or edge 314a of a center link 314 (or other chain element or component). The separation distance between the sensing device 322 and the sensing devices 323 and/or 324 (and/or the distance between the areas or regions or locations targeted by or encompassed by the sensing devices) is also known. The sensing device 322 may be upstream or downstream of the sensing devices 323 and 324 while remaining within the spirit and scope of the present invention.

Because the separation distance between the sensing devices 323 and 324 is known (and the sensors may be closer together or further apart than as shown in FIG. 8), the processor 326 may readily calculate the speed of the chain at any particular time in response to output signals generated by the sensing devices 323, 324 that are indicative of the detection of the presence of the end of the center link as it passes along and through the area sensed by the sensing devices. It is desirable that the separation distance of the sensed area or location of sensing devices 323 and 324 is small enough so that the speed of the chain may be substantially accurately determined with limited or reduced variations or errors due to gaps or irregularities in the conveyor chain that may cause an inconsistent speed over a substantial length of the conveyor path.

The sensing devices 322, 323, 324 are monitored individually (or the signals generated by the sensing devices are processed individually) by processor 326, and the processor 326 processes the signals to determine a speed of the chain at a particular detection time (such as by calculating the speed by determining an elapsed time for a chain element or feature to travel the known distance between the sensing devices 323 and 324 or targeted area of the sensing devices). Based on the determined speed of the chain, and in response to the output signals of the first and second sensing devices 322, 323 (or output signals of the first and third sensing devices 322, 324), the processor may determine the distance between the two detected chain elements or features (such as the leading edges of two consecutive or spaced apart center links).

For example, sensing device 322 may detect the leading edge of a center link, whereby such detection may trigger the other sensing devices to activate and/or may trigger the processor to process the output signals of the other sensing devices, in order to detect the respective leading edge of another center link. The processor may then determine the speed of the chain at that time in response to the elapsed time between the detection of the second leading edge by sensing devices 323 and 324, and may determine the distance between the detected leading edges of the two separated center links in response to the elapsed time between the detection of the respective leading edges by sensing devices 322 and 323 (or sensing devices 322 and 324 depending on the particular arrangement of the sensing devices).

Thus, upon detection of a chain feature or characteristic by sensing device 322, sensing devices 323 and 324 may be triggered or activated to sense a chain feature or characteristic and determine the speed of the chain at that time. The controller may then determine the distance between the chain feature detected by sensing device 322 and the chain feature detected by sensing device 323 (or sensing device 324) and may compare the determined distance to a baseline or expected chain section length to determine the degree of wear in that particular section of chain. Optionally, the controller may compare the time (following or preceding the detection of the first chain portion) at which one of the sensing devices 323, 324 detects the second chain portion with an expected time value, with the expected time value being the time between detections that would be expected for an unworn section of chain if the unworn section of chain were traveling at the calculated speed. Any difference in a measured time (such as measured via a timing device of the processor) from the expected or baseline time may be readily used to calculate the degree of wear in the section of chain.

Although shown as having the sensing devices sensing leading edges of consecutive center links, the sensing devices may be otherwise located to detect spaced apart center links and/or other chain elements or features without affecting the scope of the present invention. For example, the sensing devices may be arranged to detect a chain pin or a protrusion of a chain pin (such as via utilizing aspects of the detection systems described in U.S. Pat. Nos. 6,862,939 and 6,993,978, which are hereby incorporated herein by reference in their entireties). For example, the sensing devices may detect a protrusion or extension extending longitudinally from an end of at least some of the chain pins, such as a pyramid-shaped extension, a cylindrical-shaped extension, a wedge-shaped extension or a conical-shaped extension extending or protruding longitudinally from an end of at least some of the pins of the conveyor chain. Although the sensing devices are shown with the first sensing device 322 detecting a leading edge of a leading center link, and with the second and third sensing devices detecting a leading edge of a following center link, the sensing devices may be otherwise arranged to detect chain features in different locations along the conveying path, while remaining within the spirit and scope of the present invention.

Therefore, the present invention provides a conveyor system and/or method that is operable to determine a chain pitch or a distance between portions of a chain or section of chain, such as between two adjacent or consecutive chain pins (or spaced apart non-consecutive pins) or between adjacent or consecutive chain links or spaced apart non-consecutive chain links or the like. The first sensing device detects the presence of the first portion or pin at a particular location relative to the first sensing device, and the output signal generated by the first sensing device triggers or causes the control to actuate the second sensing device to determine the location (such as via a distance determination from the second sensing device to the second portion) of the second chain portion or pin. The distance between the first and second chain portions thus may be determined as a function of the known location of the first chain portion relative to the first sensing device, the known distance between the two sensing devices and the speed of the chain at that time and/or the determined or measured distance between the second sensing device and the second chain portion at or substantially at the time that the relative location of the first chain portion is known. Optionally, the wear or chain pitch may be determined by capturing an image of a chain feature or characteristic a known distance from the proximity sensor and comparing the captured image to a baseline feature. The measurement device or system or method of the present invention thus may provide a distance measurement between consecutive or adjacent chain pins or other chain portions or may compare the actual position and orientation of the chain component to a baseline position and orientation to determine the pitch of the chain for at least some, and optionally all, of the sections of links of the chain. The measurement device or system or method of the present invention thus provides for direct pitch measurement of chain sections rather than relative wear patterns as provided by known or conventional systems.

Changes and modifications to the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. A conveyor system comprising:
   a conveyor line;
   a conveyor chain movable along said conveyor line, said conveyor chain comprising a plurality of center links, a plurality of side links and a plurality of chain pins that connect respective side and center links together;
   a first sensing device positioned at said conveyor line and directed toward said conveyor chain, said first sensing device sensing the presence of a first chain portion of said conveyor chain as said conveyor chain moves along said conveyor line;
   a second sensing device positioned at said conveyor line and directed generally toward said conveyor chain, said second sensing device sensing a second chain portion of said conveyor chain as said conveyor chain moves along said conveyor line, wherein said second sensing device is triggered to sense said second chain portion in response to an indication of said first sensing device sensing presence of said first chain portion; and
   a controller operable to determine a degree of wear in a section of chain extending between said first and second chain portions in response to an output of said first sensing device indicative of said first sensing device sensing said first chain portion of said conveyor chain and an output of said second sensing device indicative of said second sensing device sensing said second chain portion of said conveyor chain.

2. The conveyor system of claim 1, wherein said controller determines a degree of wear based at least in art on a distance between said second sensing device and said second chain portion when said second sensing device is triggered to sense said second chain portion.

3. The conveyor system of claim 1, wherein said first and second chain portions comprise head portions of first and second chain pins of said conveyor chain.

4. The conveyor system of claim 1, wherein said first and second chain portions comprise projections at head portions of first and second chain pins of said conveyor chain.

5. The conveyor system of claim 1, wherein said first and second chain portions comprise an edge of a portion of a respective one of said side links or said center links.

6. The conveyor system of claim 1, wherein said first sensing device comprises a proximity sensor that detects the presence of said first chain portion at a predetermined location along said conveyor line and relative to said first sensing device.

7. A conveyor system comprising:
   a conveyor line;
   a conveyor chain movable along said conveyor line, said conveyor chain comprising a plurality of center links, a plurality of side links and a plurality of chain pins that connect respective side and center links together;
   a first sensing device positioned at said conveyor line and directed toward said conveyor chain, said first sensing device sensing the presence of a first chain portion of said conveyor chain as said conveyor chain moves along said conveyor line, wherein said first sensing device comprises a proximity sensor that detects the presence of said first chain portion at a predetermined location along said conveyor line and relative to said first sensing device;
   a second sensing device positioned at said conveyor line and directed generally toward said conveyor chain, said second sensing device sensing a second chain portion of said conveyor chain as said conveyor chain moves along said conveyor line, wherein said first sensing device generates an output signal when said first sensing device detects the presence of said first chain portion at the predetermined location, said second sensing device sensing said second chain portion in response to said output signal; and
   a controller operable to determine a degree of wear in a section of chain extending between said first and second chain portions in response to an output of said first sensing device indicative of said first sensing device sensing said first chain portion of said conveyor chain and an output of said second sensing device indicative of said second sensing device sensing said second chain portion of said conveyor chain.

8. The conveyor system of claim 7, wherein said second sensing device senses a distance from said second sensing device to said second chain portion in response to said output signal.

9. The conveyor system of claim 8, wherein said first and second sensing devices are spaced a predetermined spacing distance apart, said controller being operable to determine a distance between said first and second chain portions of said conveyor chain as a function of the predetermined spacing distance and the sensed distance from said second sensing device to said second chain portion.

10. The conveyor system of claim 9, wherein said first and second sensing devices are mounted to a common mounting plate positioned at said conveyor line.

11. The conveyor system of claim 1, wherein said controller monitors a degree of wear in sections of said chain by monitoring distances between said first and second chain portions.

12. The conveyor system of claim 1, wherein said controller compares a determined distance between said first and second chain portions with a baseline distance to determine said degree of wear in the section of chain.

13. A conveyor system comprising:
   a conveyor line;
   a conveyor chain movable along said conveyor line, said conveyor chain comprising a plurality of center links, a plurality of side links and a plurality of chain pins that connect respective side and center links together;
   a first sensing device positioned at said conveyor line and directed toward said conveyor chain, said first sensing device sensing the presence of a first chain portion of said conveyor chain as said conveyor chain moves along said conveyor line;
   a second sensing device positioned at said conveyor line and directed generally toward said conveyor chain, said second sensing device sensing a second chain portion of said conveyor chain as said conveyor chain moves along said conveyor line, wherein said second sensing device comprises an imaging sensor that captures image data indicative of said second chain portion in response to said first sensing device sensing said first chain portion; and
   a controller operable to determine a degree of wear in a section of chain extending between said first and second chain portions in response to an output of said first sensing device indicative of said first sensing device sensing said first chain portion of said conveyor chain and an output of said second sensing device indicative of said second sensing device sensing said second chain portion of said conveyor chain.

14. The conveyor system of claim 13, wherein said controller processes said captured image data to determine said degree of wear in the section of chain.

15. The conveyor system of claim 14, wherein said controller processes said captured image data and compares a current captured image of said second chain portion to a baseline parameter to determine said degree of wear in the section of chain.

16. A conveyor system comprising:
a conveyor line;
a conveyor chain movable along said conveyor line, said conveyor chain comprising a plurality of center links, a plurality of side links and a plurality of chain pins that connect respective side and center links together;
a first sensing device positioned at said conveyor line and directed toward said conveyor chain, said first sensing device sensing the presence of a first chain portion of said conveyor chain as said conveyor chain moves along said conveyor line;
a second sensing device positioned at said conveyor line and directed generally toward said conveyor chain, said second sensing device sensing a second chain portion of said conveyor chain as said conveyor chain moves along said conveyor line;
a third sensing device positioned at said conveyor line and directed generally toward said conveyor chain, said third sensing device sensing said second chain portion of said conveyor chain as said conveyor chain moves along said conveyor line; and
a controller operable to determine a degree of wear in a section of chain extending between said first and second chain portions in response to an output of said first sensing device indicative of said first sensing device sensing said first chain portion of said conveyor chain and an output of said second sensing device indicative of said second sensing device sensing said second chain portion of said conveyor chain, said controller determining a speed of said conveyor chain in response to a separation distance of targeted areas of said second and third sensing devices and an elapsed time between detection of said second chain portion by said second and third sensing devices.

17. The conveyor system of claim 16, wherein said controller determines a distance between said first and second chain portions in response to the determined speed of said conveyor chain and an output of said first sensing device indicative of said first sensing device sensing said first chain portion of said conveyor chain and an output of said second sensing device indicative of said second sensing device sensing said second chain portion of said conveyor chain.

18. The conveyor system of claim 17, wherein said controller compares the determined distance between said first and second chain portions with a baseline distance to determine said degree of wear in the section of chain.

19. A method of measuring chain wear in a section of conveyor chain traveling along a conveyor line, said method comprising:
providing first and second sensing devices spaced apart at a predetermined spacing distance;
sensing the presence of a first chain portion of said conveyor chain with said first sensing device when said first chain portion of said conveyor chain is at a predetermined location relative to said first sensing device and generating an output when said first chain portion is sensed;
sensing a second chain portion of said conveyor chain with said second sensing device, wherein said sensing of said second chain portion with said second sensing device is triggered in response to an indication of said first sensing device sensing the presence of said first chain portion; and
determining a degree of wear of a section of chain extending between said first and second chain portions of said conveyor chain in response to an output of said first sensing device indicative of said first sensing device sensing said first chain portion of said conveyor chain and an output of said second sensing device that is indicative of said second sensing device sensing said second chain portion of said chain.

20. The method of claim 19, wherein determining a degree of wear comprises determining a distance between said second sensing device and said second chain portion when said second sensing device is triggered to sense said second chain portion.

21. The method of claim 19, wherein said first sensing device comprises a proximity sensor that detects the presence of said first chain portion at the predetermined location along said conveyor line.

22. The method of claim 21, wherein said second sensing device senses a distance from said second sensing device to said second chain portion in response to said output.

23. The method of claim 22, wherein determining a degree of wear of said section of chain comprises determining a distance between said first and second chain portions of said conveyor chain as a function of the predetermined spacing distance and the sensed distance from said second sensing device to said second chain portion at substantially the moment in time when said first chain portion is sensed by said first sensing device.

24. The method of claim 19 including monitoring a degree of wear in said section of chain by monitoring distances between said first and second chain portions.

25. The method of claim 19 including comparing a determined distance between said first and second chain portions with a baseline distance to determine said degree of wear in the section of chain.

26. A method of measuring chain wear in a section of conveyor chain traveling along a conveyor line, said method comprising:
providing first and second sensing devices spaced apart at a predetermined spacing distance;
sensing the presence of a first chain portion of said conveyor chain with said first sensing device when said first chain portion of said conveyor chain is at a predetermined location relative to said first sensing device and generating an output when said first chain portion is sensed;
sensing a second chain portion of said conveyor chain with said second sensing device, wherein sensing a second chain portion of said conveyor chain with said second sensing device comprises capturing an image of a second chain portion of said conveyor chain; and
determining a degree of wear of a section of chain extending between said first and second chain portions of said conveyor chain in response to an output of said first sensing device indicative of said first sensing device sensing said first chain portion of said conveyor chain and an output of said second sensing device that is indicative of said second sensing device sensing said second chain portion of said chain.

27. The method of claim 26, wherein determining a degree of wear of said section of chain comprises processing captured image data to determine said degree of wear of said section of chain.

28. The method of claim 27 including processing said captured image data and comparing a captured image of said second chain portion to a baseline parameter to determine said degree of wear in the section of chain.

29. A method of measuring chain wear in a section of conveyor chain traveling along a conveyor line, said method comprising:
- providing first and second sensing devices spaced apart at a predetermined spacing distance;
- providing a third sensing device spaced apart at a predetermined spacing distance from said second sensing device;
- sensing the presence of a first chain portion of said conveyor chain with said first sensing device when said first chain portion of said conveyor chain is at a predetermined location relative to said first sensing device and generating an output when said first chain portion is sensed;
- sensing a second chain portion of said conveyor chain with said second sensing device;
- determining a degree of wear of a section of chain extending between said first and second chain portions of said conveyor chain in response to an output of said first sensing device indicative of said first sensing device sensing said first chain portion of said conveyor chain and an output of said second sensing device that is indicative of said second sensing device sensing said second chain portion of said chain;
- sensing the second chain portion of said conveyor chain with said third sensing device; and
- determining a speed of said conveyor chain in response to said predetermined spacing distance between said second and third sensing devices and a time elapse between detection of said second chain portion by said second and third sensing devices.

30. The method of claim 29, wherein determining a degree of wear of said section of chain comprises determining a distance between said first and second chain portions in response to the determined speed of said conveyor chain and an output of said first sensing device indicative of said first sensing device sensing said first chain portion of said conveyor chain and an output of said second sensing device indicative of said second sensing device sensing said second chain portion of said conveyor chain.

31. The method of claim 29, wherein determining a degree of wear of said section of chain comprises comparing a determined distance between said first and second chain portions to a baseline parameter.

* * * * *